(12) United States Patent
Hirawaki et al.

(10) Patent No.: US 11,780,124 B2
(45) Date of Patent: Oct. 10, 2023

(54) APPARATUS FOR MANUFACTURING THERMOPLASTIC RESIN MATERIAL

(71) Applicants: HONDA MOTOR CO., LTD., Tokyo (JP); KADO Corporation, Hyogo (JP); NATIONAL UNIVERSITY CORPORATION TOKAI NATIONAL HIGHER EDUCATION AND RESEARCH SYSTEM, Aichi (JP); Toray Industries, Inc., Tokyo (JP); Teijin Limited, Osaka (JP); SUBARU CORPORATION, Tokyo (JP); TOYOTA JIDOSHA KABUSHIKI KAISHA, Aichi (JP); KYOWA INDUSTRIAL CO., LTD., Niigata (JP)

(72) Inventors: Satoshi Hirawaki, Wako (JP); Yoshiaki Matsumoto, Tatsuno (JP); Shunya Hatanaka, Nagoya (JP); Takashi Kusaka, Nagoya (JP); Yasunari Kuratani, Tatsuno (JP)

(73) Assignees: HONDA MOTOR CO., LTD., Tokyo (JP); KADO CORPORATION, Tatsuno (JP); NATIONAL UNIVERSITY CORPORATION TOKAI NATIONAL HIGHER EDUCATION AND RESEARCH SYSTEM, Nagoya (JP); TORAY INDUSTRIES, INC., Tokyo (JP); TEIJIN LIMITED, Osaka (JP); SUBARU CORPORATION, Tokyo (JP); TOYOTA JIDOSHA KABUSHIKI KAISHA, Toyota (JP); KYOWA INDUSTRIAL CO., LTD., Sanjo (JP)

( * ) Notice: Subject to any disclaimer, the term of this patent is extended or adjusted under 35 U.S.C. 154(b) by 541 days.

(21) Appl. No.: 16/770,268

(22) PCT Filed: Dec. 7, 2018

(86) PCT No.: PCT/JP2018/045114
§ 371 (c)(1),
(2) Date: Jun. 5, 2020

(87) PCT Pub. No.: WO2019/112043
PCT Pub. Date: Jun. 13, 2019

(65) Prior Publication Data
US 2020/0384671 A1    Dec. 10, 2020

(30) Foreign Application Priority Data
Dec. 8, 2017    (JP) .............................. JP2017-236125

(51) Int. Cl.
*B29C 43/34*    (2006.01)
*B29C 43/58*    (2006.01)

(52) U.S. Cl.
CPC .............. *B29C 43/34* (2013.01); *B29C 43/58* (2013.01); *B29C 2043/3411* (2013.01); *B29C 2043/5816* (2013.01); *B29C 2043/5875* (2013.01)

(58) Field of Classification Search
CPC ....... B29C 31/00; B29C 31/008; B29C 31/04; B29C 31/045; B29C 31/06; B29C 31/061;
(Continued)

(56) References Cited

U.S. PATENT DOCUMENTS

2004/0130072 A1    7/2004    Sekido et al.
2009/0087932 A1    4/2009    Kondoh
(Continued)

FOREIGN PATENT DOCUMENTS

CN    101399217 A    4/2009
CN    101521172 A    9/2009
(Continued)

OTHER PUBLICATIONS

Office Action received in corresponding Japanese application No. 2017-236125 dated Dec. 14, 2021 with English translation (6 pages).

(Continued)

*Primary Examiner* — Thu-Khanh T. Nguyen
(74) *Attorney, Agent, or Firm* — Rankin, Hill & Clark LLP

(57) ABSTRACT

An apparatus for manufacturing a thermoplastic resin material, including: a mold for molding a base material containing a thermoplastic resin into a predetermined shape; and a transfer mechanism that places the base material in the mold, wherein the transfer mechanism includes a detection mechanism that detects a state of the base material, and a controlling unit that controls operation of the mold and the transfer mechanism.

5 Claims, 9 Drawing Sheets

(58) Field of Classification Search
CPC ....... B29C 31/066; B29C 31/08; B29C 35/00; B29C 35/002; B29C 35/0277; B29C 35/0288; B29C 43/34
See application file for complete search history.

(56) References Cited

U.S. PATENT DOCUMENTS

| 2009/0222135 | A1 | 9/2009 | Asakawa |
| 2011/0024953 | A1* | 2/2011 | Winzinger ............ B29C 49/12 425/526 |
| 2012/0316678 | A1 | 12/2012 | Asakawa |

FOREIGN PATENT DOCUMENTS

| CN | 102528803 A | 7/2012 |
| JP | H05-228952 A | 9/1993 |
| JP | 2003-048223 A | 2/2003 |
| JP | 2010-173166 A | 8/2010 |
| JP | 2011-037032 A | 2/2011 |
| JP | 2012-111084 A | 6/2012 |
| JP | 2013-216078 A | 10/2013 |
| JP | 2014-051035 A | 3/2014 |
| JP | 2017-119427 A | 7/2017 |
| JP | 2017-152664 A | 8/2017 |

OTHER PUBLICATIONS

International Search Report by ISA/JP dated Feb. 12, 2019, on PCT/JP2018/045114, 1 page.
Written Opinion by ISA/JP dated Feb. 12, 2019, on PCT/JP2018/045114, 3 pages.
Office Action received in corresponding CN application No. 201880079377.7 dated Aug. 24, 2021 with English translation (15 pages).

* cited by examiner

APPARATUS FOR MANUFACTURING THERMOPLASTIC RESIN MATERIAL

TECHNICAL FIELD

The present invention relates to an apparatus for manufacturing thermoplastic resin material.

BACKGROUND ART

There has been known an apparatus for manufacturing a composite thermoplastic resin material by placing a primary molded material including a thermoplastic resin in a specified mold and then secondarily injecting a melted thermoplastic resin into the mold (see, for example, patent literature 1). Such a composite thermoplastic resin material has improved properties in various functionalities such as, for example, stiffness, incombustibility, corrosion resistance, impact resistance, and decorative appearance.

RELATED ART DOCUMENTS

Patent Literatures

Patent Literature 1: JP 2013-216078 A

SUMMARY OF THE INVENTION

Problems to be Solved by the Invention

For traditional apparatuses for manufacturing thermoplastic resin materials (see, for example, patent literature 1), if the fluidity of the resins being combined is not kept favorable in the mold, it is impossible to produce a thermoplastic resin material with high quality.

For this reason, an apparatus for manufacturing thermoplastic resin materials is demanded in which the time taken to put the base material into the mold is short and in which thus the base material can be put into the mold without the temperature of the base material decreasing.

Hence, an object of the present invention is to provide an apparatus for manufacturing thermoplastic resin materials in which the time taken to put the base material into the mold is shorter and in which thus the base material can be put into the mold without the temperature of the base material decreasing.

Means for Solving the Problems

An apparatus for manufacturing a thermoplastic resin material to solve the above problem, includes: a mold for molding a base material containing a thermoplastic resin into a predetermined shape; and a transfer mechanism that places the base material in the mold, in which the transfer mechanism includes a detection mechanism that detects a state of the base material and a controlling unit that controls operation of the mold and the transfer mechanism.

Advantageous Effects of the Invention

The present invention makes it possible to provide an apparatus for manufacturing thermoplastic resin materials in which the time taken to put the base material into the mold is shorter and in which thus the base material can be put into the mold without the temperature of the base material decreasing.

EMBODIMENTS FOR CARRYING OUT THE INVENTION

Next is described in detail and an apparatus for manufacturing thermoplastic resin material according to an embodiment of the present invention. First, thermoplastic resin material obtained by the apparatus is described below, and then, the apparatus is explained.

<<Thermoplastic Resin Material>>

The thermoplastic resin material according to this embodiment is intended to be used for a vehicle component member. The vehicle component member includes, for example, a vehicle frame member such as a panel member, a side sill, a center pillar, and a floor cross member. The thermoplastic resin material in this embodiment is not, however, limited to be used only for the vehicle component member as described above. The thermoplastic resin material can be applied to, for example: a component member of a moving body other than a vehicle, such as a ship and an aircraft; and a component member of, for example, a building, a device, and an equipment of various types.

Figure 1:
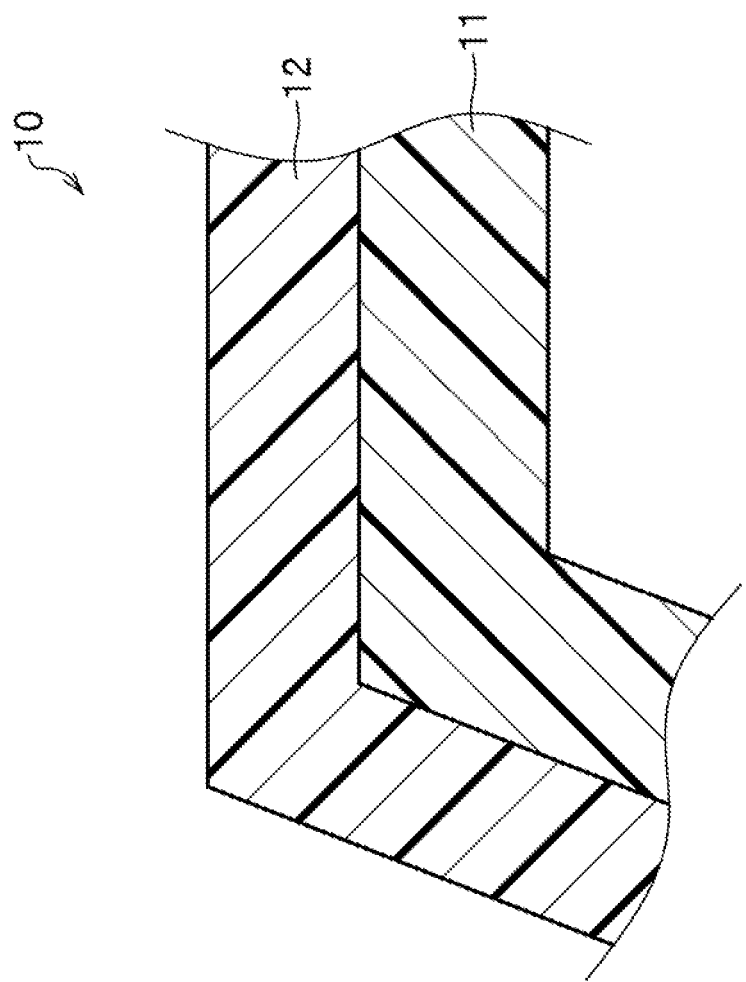
FIG. 1 is a partial cross-sectional diagram showing a thermoplastic resin material obtained by a manufacturing method according to an embodiment of the present invention.

FIG. 1 is a partial cross-sectional diagram showing thermoplastic resin material 10 obtained by the manufacturing method according to this embodiment.

As shown in FIG. 1, the thermoplastic resin material 10 is an integrally molded object composed of main base material 11 and auxiliary base material 12. In addition, the main base material 11 corresponds to the "base material" in claims.

The main base material 11 (base material) in this embodiment contains thermoplastic resin. The main base material 11 makes a shape of the thermoplastic resin material 10. More specifically, the main base material 11: flows in a mold when thermoplastic resin material 10 is molded, which is to be described later; thereby becomes integral with the auxiliary base material 12; and forms a rough contour of the thermoplastic resin material 10, together with the auxiliary base material 12.

The main base material 11: contains at least thermoplastic resin; may contain only the thermoplastic resin; and may contain filling material in addition to the thermoplastic resin.

The thermoplastic resin include, for example, but not limited to: crystalline resin such as high-density polyethylene, low-density polyethylene, polypropylene, polyamide resin, polyacetal, polyethylene terephthalate, polybutylene terephthalate, polyphenylene sulfide, and polyetheretherketone; and non-crystalline resin such as polystyrene, polyvinyl chloride, AS resin, ABS resin, acrylic resin, polycarbonate, and modified polyphenylene ether.

The filling material is preferably fiber. The fiber includes, for example, but not limited to, carbon fiber, glass fiber, and aramid fiber.

The fiber material is preferably carbon fiber. Short fiber having a fiber length equal to or smaller than 20 mm is more preferable. Such carbon fiber may be derived from either PAN or pitch.

When the main base material 11 contains filling material, a content of the filling material can be set appropriately depending on usage of the thermoplastic resin material 10. When the main base material 11 contains carbon fiber and is intended to be applied to a vehicle component member, a volume fraction (Vf) of the carbon fiber in the main base material 11 is preferably set at equal to or higher than 20% and equal to or lower than 60%. As described hereinafter, when the auxiliary base material 12 contains carbon fiber, a volume fraction (Vf) of the carbon fiber in the entire thermoplastic resin material 10 is preferably set at equal to or higher than 20% and equal to or lower than 60%. The volume fraction (Vf) of the carbon fiber is used herein for the same meaning as a fiber volume content (Vf) specified in the JIS K 7035 (2014).

When the thermoplastic resin material 10 is used for a vehicle component member, the auxiliary base material 12 in this embodiment forms a side nearer to a surface of the vehicle component member.

The auxiliary base material 12 is disposed along a cavity of a mold 31 (see FIG. 2) as described in detail hereinafter. The auxiliary base material 12 has a sheet-like shape and is high in mold conforming capability.

The auxiliary base material 12 is on the surface side of the thermoplastic resin material 10 and gives thermoplastic resin material 10 an added value. More specifically, the auxiliary base material 12 gives such functions as rigidity, incombustibility, corrosion resistance, impact resistance, and design property to the surface side of the thermoplastic resin material 10, depending on the aforementioned usage of the thermoplastic resin material 10.

The auxiliary base material 12 of this embodiment includes, for example, but not limited to, thermoplastic resin-containing sheet. The auxiliary base material 12 may include a metal film, and other materials.

The auxiliary base material 12 intended for application to a vehicle component member is preferably a thermoplastic resin-containing sheet containing fiber. The thermoplastic resin and the fiber used herein can be that used for the main base material 11 as described above. In particular, the auxiliary base material 12 containing carbon fiber and thermoplastic resin is more preferable.

Thermoplastic resin used for the main base material 11 and that used for the auxiliary base material 12 are preferably of the same type. That is, if, for example, polyamide resin is used for the main base material 11, polyamide resin is preferably used also for the auxiliary base material 12.

A content of the carbon fiber in the aforementioned auxiliary base material 12 is, as described above, preferably set at equal to or higher than 20% and equal to or lower than 60% of a volume fraction (Vf) of the carbon fiber in the entire thermoplastic resin material 10.

When the auxiliary base material 12 is intended to be applied to a vehicle component member, a volume fraction (Vf) of carbon fiber in the auxiliary base material 12 is preferably set higher than that in the main base material 11 so as to provide the surface side of the thermoplastic resin material 10 with strength, rigidity, or the like against collision load.

More specifically, a ratio $(Vf_S/Vf_M)$ of a volume fraction $(Vf_S)$ of carbon fiber in the auxiliary base material 12 to a volume fraction $(Vf_M)$ of carbon fiber in the main base material 11 is preferably set at higher than 1 and equal to or lower than 2.5.

When the ratio is set as described above, the thermoplastic resin material 10 in this embodiment can further improve strength, rigidity, or the like thereof against collision load, and can further keep high fluidity of thermoplastic resin in a mold at a time of molding to be described hereinafter.

When the volume fraction $(Vf_S)$ of carbon fiber in the auxiliary base material 12 is set higher than the volume fraction $(Vf_M)$ of carbon fiber in the main base material 11, surface roughness on a side nearer to the main base material 11 of the auxiliary base material 12 can be made higher. This also contribute to a possible anchor effect (an increase in bond strength at interface) by the thermoplastic resin on the main base material 11 side.

In this case, the above-described ratio $(Vf_S/Vf_M)$ is preferably equal to or higher than 1.3.

<<Apparatus for Manufacturing Thermoplastic Resin Material>>

Next is described an apparatus for manufacturing thermoplastic resin material 10 (see FIG. 1).

Figure 2:
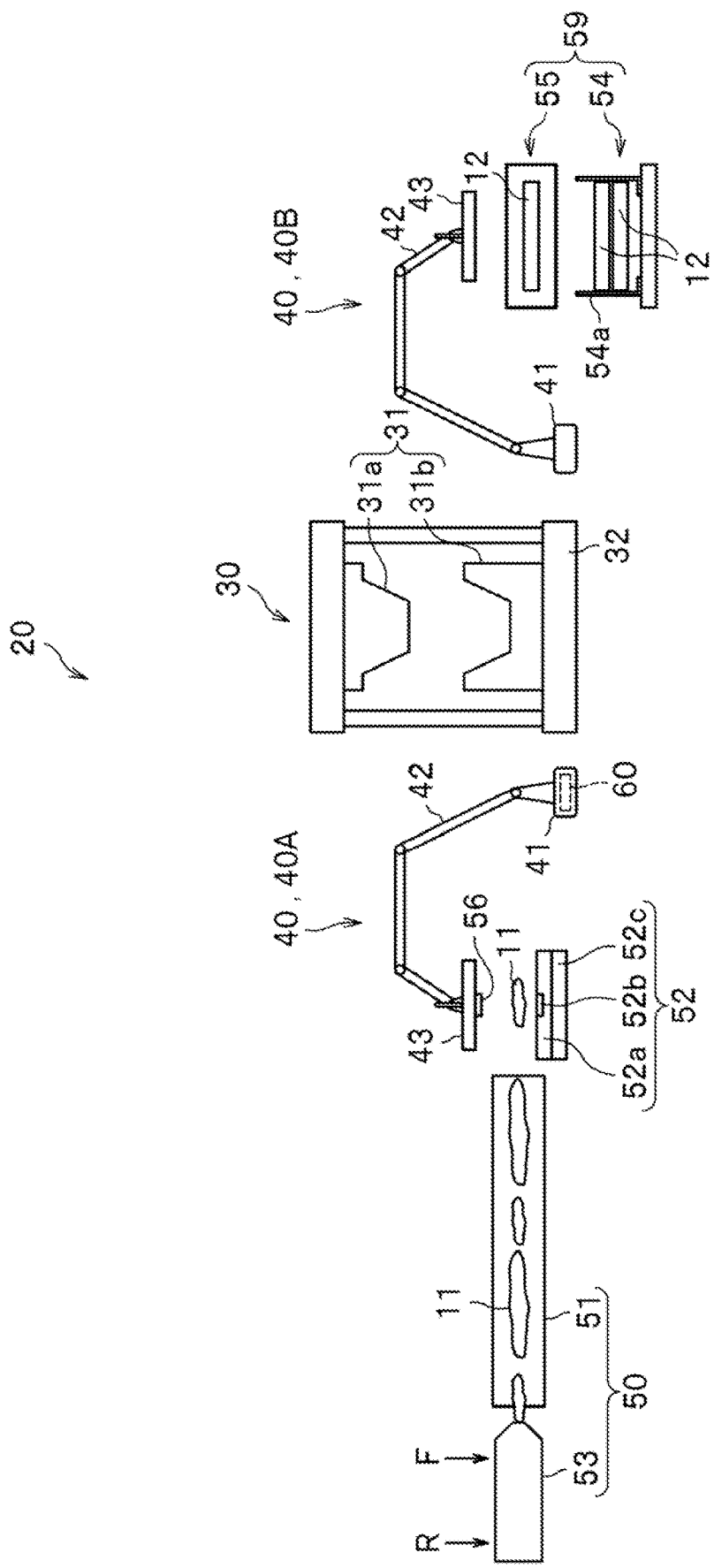
FIG. 2 is an explanatory diagram showing a structure of an apparatus for manufacturing the thermoplastic resin material according to the embodiment of the present invention.
Figure 3:
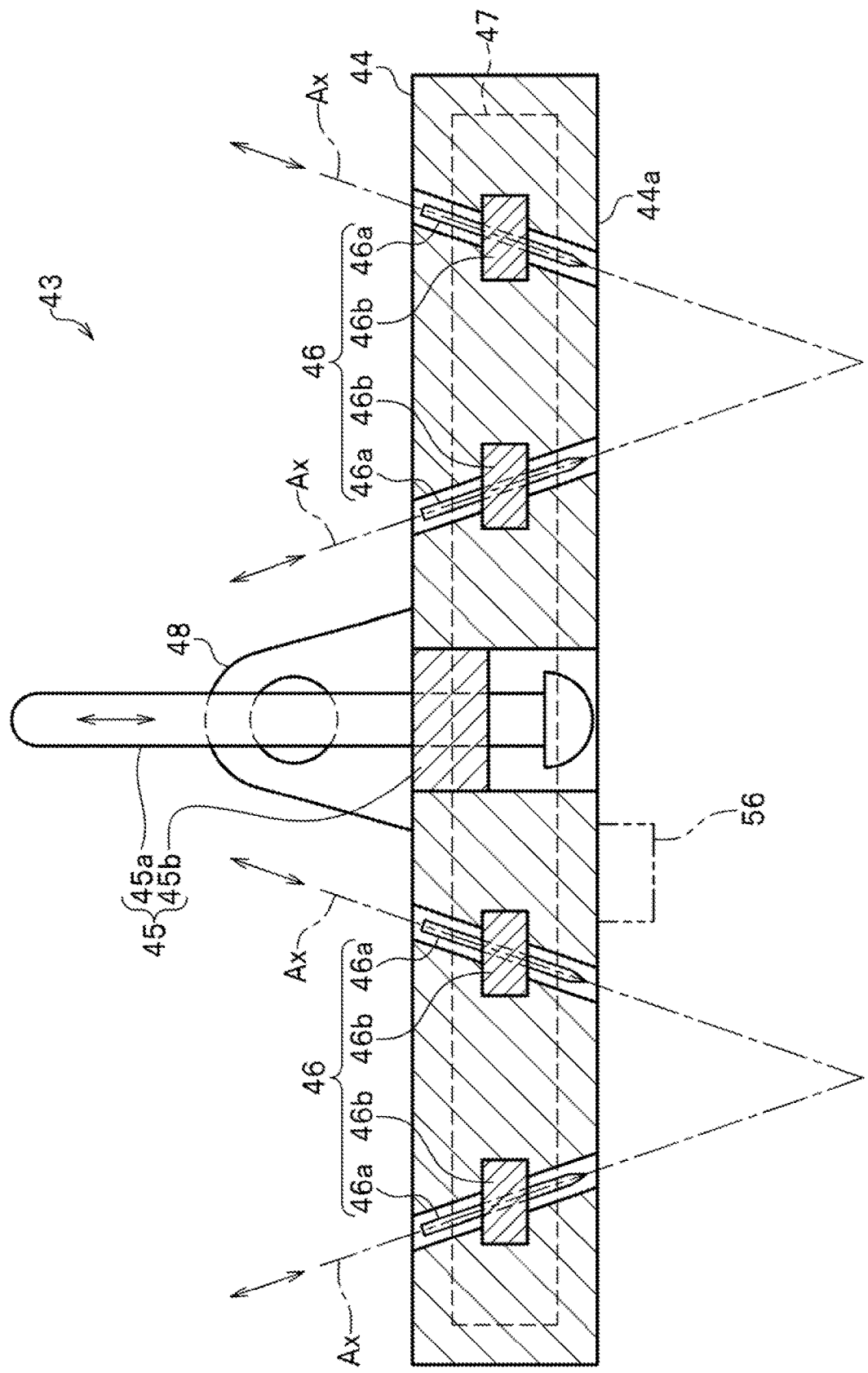
FIG. 3 is an explanatory diagram showing a structure of a hand part of a material handling robot constituting the apparatus of FIG. 2.

FIG. 2 is an explanatory diagram showing a structure of a manufacturing apparatus 20 according to this embodiment. FIG. 3 is an explanatory diagram showing a structure of a hand part 43 of a material handling robot 40 constituting the manufacturing apparatus 20 of FIG. 2.

As shown in FIG. 2, the manufacturing apparatus 20 includes a feeder 50 of the main base material 11, a pedestal 52 of the main base material 11, a feeder 59 of an auxiliary base material 12, a press device 30 and a material handling robot 40.

<Feeder for Main Base Material>

The feeder 50 is mainly constituted of a kneading extruder 53 for the main base material 11 and a heat insulating chamber 51 for the main base material 11.

The kneading extruder 53 is configured to knead thermoplastic resin R, as the matrix constituting the main base material 11, and filling material F, which are put into the kneading extruder 53, at a specified temperature (for example, a temperature higher than or equal to the melting point of the thermoplastic resin) and to extrude the main base material 11 plasticized by this kneading.

Meanwhile, the kneading extruder 53 in this embodiment is assumed to be, for example, a long fiber thermoplastic-direct (LFT-D) extruder in which a twin-screw melt kneader for thermoplastic resin pellets is combined with a cutter for long carbon fibers drawn from carbon fiber rovings, but the kneading extruder 53 is not limited to this type.

The heat insulating chamber 51 includes a cutting unit (not shown) that cuts the main base material 11 extruded from the kneading extruder 53 into a predetermined length based on the arrangement position within the mold 31 described later, a conveyer (not shown) that conveys the cut main base material 11 in the direction away from the extrusion hole of the kneading extruder 53, and a heater (not shown) that keeps the temperature of the main base material 11 conveyed by this conveyer at a predetermined temperature or higher. Meanwhile, the temperature of the main base material 11 in the heat insulating chamber 51 is kept by means of this heater at a temperature that keeps the main base material 11 in a plasticized state (for example, at around the melting point of the thermoplastic resin).

<Pedestal>

The pedestal 52 includes a table 52a on which the main base material 11 conveyed from the heat insulating chamber 51 is placed, an optical sensor 52b, and a heater 52c.

The optical sensor 52b detects the main base material 11 placed on the pedestal 52 and outputs a detection signal indicating the detection of the main base material 11 to a controlling unit 60 described later.

The heater 52c keeps the temperature of the placed main base material 11 at a predetermined temperature until the main base material 11 is conveyed by a first material handling robot 40A described later. This heater 52c corresponds the "second temperature adjusting unit" in the claims. Meanwhile, a heater 47 (see FIG. 3) corresponding to a first temperature adjusting unit is disposed at the hand part 43 (see FIG. 3) of the first material handling robot 40A, as described later.

The foregoing predetermined temperature set in the heater 52c is set to a degree with which the shape of the main base material 11 can be maintained and the main base material 11 can be conveyed by the first material handling robot 40A.

In addition, this predetermined temperature is set to a degree with which the fluidity of the thermoplastic resin contained in the main base material 11 is not lost when the main base material 11 is conveyed into the mold 31 and molded. The predetermined temperature can be concretely set as appropriate depending on the used thermoplastic resin, but it is preferably set to a temperature over the melting point of the thermoplastic resin.

The heater 52c of this pedestal 52 is controlled by the controlling unit 60 provided to the first material handling robot 40A, as described later.

Although not illustrated, the table 52a in this embodiment has multiple intersecting ribs protruding on its upper surface in a mesh shape (so as to form a matrix of cells). This configuration reduces the contact area between the table 52a and the main base material 11. This makes it easy for the first material handling robot 40A to separate the main base material 11 from the table 52a to convey it. The table 52a may have a release layer composed of, for example, Teflon (registered trademark) or the like on its upper surface.

<Feeder for Auxiliary Base Material>

The feeder 59 for the auxiliary base material 12 includes a storage unit 54 for the auxiliary base material 12, a heating chamber 55 for the auxiliary base material 12, and a not-illustrated lift that moves the auxiliary base material 12 taken out of the storage unit 54 to the heating chamber 55.

The auxiliary base material 12 in this embodiment is assumed to be a plate-shaped material having a rectangular shape in plain view with longitudinal and lateral sides cut into predetermined lengths.

The storage unit 54 stores multiple auxiliary base materials 12 placed in order in the up-down direction using a stocking jig 54a. Specifically, the auxiliary base material 12 placed in the storage unit 54 in this embodiment is positioned at predetermined coordinates within the operation range of a second material handling robot 40B described later.

The heating chamber 55 is disposed over the storage unit 54. The auxiliary base material 12 is moved from the storage unit 54 into the heating chamber 55 by the lift (not shown), and then the auxiliary base material 12 is heated there to a predetermined temperature and plasticized. This predetermined temperature is set to a degree with which the shape of the auxiliary base material 12 can be maintained and the auxiliary base material 12 can be conveyed by the second material handling robot 40B.

In addition, this predetermined temperature is set to a degree with which the fluidity of the thermoplastic resin contained in the auxiliary base material 12 is not lost when the auxiliary base material 12 is conveyed into the mold 31 and molded.

The predetermined temperature can be concretely set as appropriate depending on the used thermoplastic resin, but it is preferably set to a temperature over the melting point of the thermoplastic resin.

Meanwhile, the temperature control of the heating chamber 55 can be performed by the controlling unit 60 described later or also can be performed by a dedicated temperature adjustment device included in the heating chamber 55.

<Press Device>

The press device 30 includes, as major parts thereof a mold 31 that includes an upper mold 31a and a lower mold 31b; a base 32 that supports the lower mold 31b; and a lifting and lowering part (not shown) that supports the upper mold 31a above the lower mold 31b and moves the upper mold 31a up and down with respect to the lower mold 31b.

When the upper mold 31a is situated on top of the lower mold 31b in an up-and-down direction, the mold 31 has a cavity formed inside thereof. When the lifting and lowering part presses down the upper mold 31a against the lower mold 31b on the base 32 at a prescribed pressure, molding materials (the main base material 11 and the auxiliary base material 12) disposed in the cavity are press-molded.

<Material Handling Robot>

The material handling robot 40 is constituted of the first material handling robot 40A and the second material handling robot 40B Note that the first material handling robot 40A in this embodiment corresponds to the "transfer mechanism" in the claims.

The first material handling robot 40A conveys the main base material 11 (base material) from the pedestal 52 to the mold 31.

The second material handling robot 40B conveys the auxiliary base material 12 from the heating chamber 55 to the mold 31. The second material handling robot 40B in this embodiment takes the thermoplastic resin material 10 (see FIG. 1) molded in the mold 31 out of the mold 31.

The first material handling robot 40A is different from the second material handling robot 40B in that the first material handling robot 40A includes an imaging camera 56 as a detection mechanism described in detail later and the controlling unit 60. In other words, the second material handling robot 40B in this embodiment is different from the first material handling robot 40A in that the second material handling robot 40B does not include an imaging camera 56 and a controlling unit 60. However, the second material handling robot 40B may have a configuration with these imaging camera 56 and controlling unit 60 as shown in a modified example described later.

Although not-illustrated, the second material handling robot 40B, unlike the first material handling robot 40A, has a suction holder that holds the thermoplastic resin material 10 by suction when taking the thermoplastic resin material 10 (see FIG. 1) out of the mold 31.

In the following description, when each of the first material handling robot 40A and the second material handling robot 40B does not have to be specified, they will simply be referred to as the material handling robot 40.

As shown in FIG. 2, the material handling robot 40 mainly includes a support part 41, an arm part 42, a hand part 43, and an actuator (not shown).

This material handling robot 40 has a configuration in which the hand part 43 can move around the support part 41 in three dimensions by means of the arm part 42. The actuator (not shown) is constituted of well-known elements such as air cylinders, gears, and cams so that the actuator can move the hand part 43 in three-dimensions as mentioned above. In FIG. 2, the reference numeral 60 indicates the controlling unit described in detail later, disposed at the support part 41 of the first material handling robot 40A.

FIG. 3 is an explanatory diagram showing the structure of the hand part 43 of the material handling robot 40 included in the manufacturing apparatus 20 in FIG. 2.

In FIG. 3, for the purpose of describing the common parts between the first material handling robot 40A and the second material handling robot 40B, the imaging camera 56 (see FIG. 2) which is included only in the first material handling robot 40A is drawn with imaginary lines (dashed double-dotted lines) for the convenience of illustration.

As shown in FIG. 3, the hand part 43 includes a main body 44, a pusher 45 (a press mechanism), a holding unit 46, and a heater 47.

The hand part 43 corresponds to the "gripping part" in claims, and the heater 47 corresponds to the "first temperature adjusting unit" in claims.

The main body 44 in this embodiment is formed in shape of a thin rectangular solid and defines a substantial contour of the hand part 43. An attaching unit 48 is disposed at a substantial center on one end face in a thickness direction of the main body 44. The attaching unit 48 is used for attaching the main body 44 to a front edge of the arm part 42 (see FIG. 2). It is to be noted that an attaching angle of the main body 44 in this embodiment to the arm part 42 (see FIG. 2) can be changed via a prescribed actuator (not shown).

In the manufacturing method to be described later, each of the main base material 11 (see FIG. 1) and the auxiliary base material 12 (see FIG. 1) is disposed on another end face 44a in the thickness direction of the main body 44 (which is a face opposite to the one end face on which the attaching unit 48 is disposed, and may also be simply referred to as the other end face 44a of the main body 44).

The pusher 45 includes a rod member 45a and an actuator 45b.

The rod member 45a is disposed so as to penetrate the main body 44 in the thickness direction thereof. The rod member 45a is attached to the main body 44 via the actuator 45b.

The rod member 45a can be moved in the thickness direction of the main body 44 by the actuator 45b.

As shown in FIG. 3, the rod member 45a in a default position does not project from the other end face 44a of the main body 44. When driven by the actuator 45b, the rod member 45a projects from the other end face 44a of the main body 44 to outside (which is downside with respect to the plane of FIG. 3).

The projected rod member 45a presses the auxiliary base material 12 (see FIG. 1) toward the lower mold 31b as hereinafter described.

It is assumed herein that the main body 44 in this embodiment includes one unit of the pusher 45. The main body 44 may be, however, configured to include two or more units of the pushers 45.

The holding unit 46 includes: a pair of needle members 46a; and an actuator 46b disposed for each of the needle members 46a. The main body 44 in this embodiment includes two pairs of the holding units 46.

A pair of the needle members 46a is disposed so as to penetrate the main body 44 in the thickness direction thereof. More specifically, a pair of the needle members 46a is disposed such that respective axes Ax thereof are intersect with each other on a side nearer to the other end face 44a of the main body 44. The needle member 46a on the side on which the axes Ax are intersect with each other has a sharp tip end.

The needle member 46a is fixed into the main body 44 via the actuator 46b.

Each of the needle members 46a can be moved in an axis Ax direction by the actuator 46b.

As shown in FIG. 3, the needle member 46a situated at the default position does not project from the other end face 44a of the main body 44. When driven by the actuator 46b, the needle member 46a projects from the other end face 44a of the main body 44 to the outside (downside with respect to the plane of FIG. 3).

The projected needle member 46a sticks the main base material 11 (see FIG. 1) or the auxiliary base material 12 (see FIG. 1). This allows the holding unit 46 to hold the main base material 11 or the auxiliary base material 12 on the side nearer to the other end face 44a of the main body 44.

It is assumed herein that the main body 44 in this embodiment includes two pairs of the holding units 46 as described above. The main body 44 may be, however, configured to include three or more pairs of the holding units 46.

The structure of the holding unit 46 is not limited to the described above, and any other structure is possible as long as the main base material 11 or the auxiliary base material 12 can be held on the other end face 44a side of the main body 44. The holding unit 46 can be modified in accordance with a shape of the main base material 11 or the auxiliary base material 12 as appropriate. The holding unit 46 can also be substituted by any other appropriate holding unit having a clamping mechanism, a suction mechanism, or the like.

The heater 47 (first temperature adjusting unit) is embedded in the main body 44. The heater 47 keeps the main base material 11 (see FIG. 1) or the auxiliary base material 12 (see FIG. 1) disposed on the other end face 44a side of the main body 44 warm.

It is assumed herein that the heater 47 in this embodiment is a fan heater. The heater 47 is not, however, limited to this, and an electric heater, an infrared heater, or the combination thereof can also be used.

<Detection Mechanism and Controlling Unit>

Next described is the imaging camera 56 (see FIG. 2) which is a detection mechanism of the first material handling robot 40A.

This imaging camera 56 detects the state of the main base material 11 (base material) on the pedestal 52 in a noncontact manner. Specifically, the imaging camera 56 detects the temperature and the position of the center of gravity of the main base material 11 (see FIG. 2) based on the captured image.

This imaging camera 56 includes, as described later, a normal-light detection unit 56a (see FIG. 4) and an infrared detection unit 56b (see FIG. 4). The normal-light detection unit 56*a* corresponds to the "gravity-center detection mechanism" in the claims. The infrared detection unit 56*b* corresponds to the "temperature detection mechanism" in the claims.

The imaging camera 56 in this embodiment is disposed at a suitable location on the face of the hand part 43 that faces the main base material 11, in other words, on the other end face 44*a* (see FIG. 3).

Next, the controlling unit 60 (see FIG. 2) will be described.

This controlling unit 60 can be constituted of a processor such as a central processing unit (CPU), read only memory (ROM) that stores programs, random access memory (RAM) for temporarily storing data, and other components.

Figure 4:
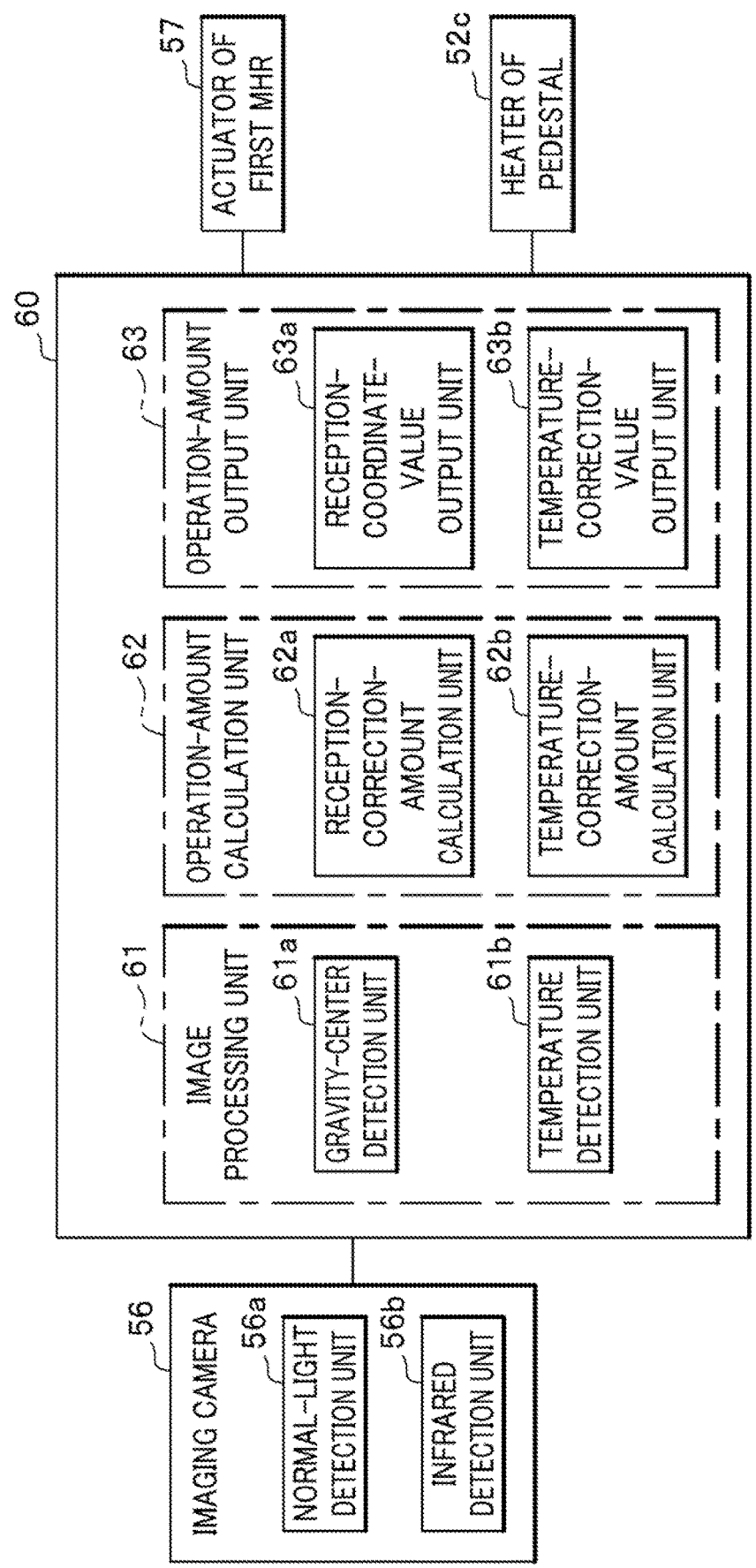
FIG. 4 is a block diagram of a controlling unit constituting the apparatus of FIG. 2.

FIG. 4 is a block diagram of the controlling unit 60. In FIG. 4, the actuator of the first MHR denoted by the reference numeral 57 means the actuator (not shown) in the first material handling robot 40A (see FIG. 2).

As shown in FIG. 4, the controlling unit 60 in this embodiment has an image processing unit 61, an operation-amount calculation unit 62, and an operation-amount output unit 63.

The image processing unit 61 is mainly constituted of a gravity-center detection unit 61*a* and a temperature detection unit 61*b*.

The gravity-center detection unit 61*a* detects the position of the center of gravity of the main base material 11 defined within its planar shape, based on the captured image of the planar shape of the main base material 11 captured by the normal-light detection unit 56*a* (for example, a CCD camera) of the imaging camera 56.

The method of detecting the coordinates of the center of gravity of the main base material 11 is not limited to any specific ones, but well-known methods can be employed. The method of detecting the coordinates of the center of gravity in this embodiment is preferably a method of directly analyzing the image such as, for example, a method of detecting the coordinates of the center of gravity based on the area of the main base material 11 included in the captured image or a method of detecting the coordinates of the center of gravity based on the outline of the main base material 11 included in the captured image.

This gravity-center detection unit 61*a* outputs the position coordinates of the main base material 11, in other words, the coordinates of the center of gravity.

The temperature detection unit 61*b* detects the temperature of the main base material 11 based on the captured image of the main base material 11 captured by the infrared detection unit 56*b* (for example, an infrared camera) of the imaging camera 56. Meanwhile, it is assumed that the infrared detection unit 56*b* in this embodiment is one having a germanium lens optical system and a cooling element (for example, a Peltier element).

This temperature detection unit 61*b* detects the surface temperature of the main base material 11 on the pedestal 52 (see FIG. 2) and outputs the detection result.

The operation-amount calculation unit 62 is mainly constituted of a reception-correction-amount calculation unit 62*a* and a temperature-correction-amount calculation unit 62*b*.

The reception-correction-amount calculation unit 62*a* calculates the amount of displacement (the amount of correction) of the hand part 43, based on the coordinates of the center of gravity of the main base material 11 outputted from the gravity-center detection unit 61*a*.

In other words, the reception-correction-amount calculation unit 62*a* calculates the amount of displacement (the reception correction amount) of the hand part 43 from the current position (coordinates) of the hand part 43 (see FIG. 2) of the first material handling robot 40A (see FIG. 2) to the coordinates of the center of gravity of the main base material 11 at which the hand part 43 is to receive the main base material 11, and outputs the calculation result.

The temperature-correction-amount calculation unit 62*b* calculates the temperature correction amount to the target temperature of the main base material 11 on the pedestal 52 based on the surface temperature of the main base material 11 outputted from the temperature detection unit 61*b*, and outputs the calculation result.

The target temperature of this main base material 11 can be set as described above to a degree with which the shape of the main base material 11 is maintained so that the main base material 11 can be conveyed by the first material handling robot 40A (see FIG. 2) and with which the fluidity of the thermoplastic resin contained the main base material 11 is not lost when the main base material 11 is conveyed into the mold 31 (see FIG. 2) and molded.

The operation-amount output unit 63 is mainly constituted of a reception-coordinate-value output unit 63*a* and a temperature-correction-value output unit 63*b*.

The reception-coordinate-value output unit 63*a* outputs the displacement instruction, in other words, the reception coordinate values for the hand part 43 to receive the main base material 11, to the actuator 57 of the first material handling robot 40A (referred to as FIRST MHR in FIG. 4), based on the amount of displacement (the reception correction amount) of the hand part 43 described above, outputted from the reception-correction-amount calculation unit 62*a*. The first material handling robot 40A moves the hand part 43 to the coordinates of the center of gravity of the main base material 11 based on this displacement instruction and holds the main base material 11 with the coordinates of the center of gravity positioned at the center.

The temperature-correction-value output unit 63*b* outputs the temperature increase instruction to increase the temperature of the main base material 11 to the target temperature, in other words, the temperature correction value to the heater 52*c* of the pedestal 52, based on the temperature correction amount described above, outputted from the temperature-correction-amount calculation unit 62*b*. Electric power based on the temperature increase instruction is inputted to the heater 52*c* via an inverter (not shown) included in the heater 52*c* and the heater 52*c* heats the main base material 11 to the target temperature. The temperature of the main base material 11 is set to the target temperature.

<<Operation of Apparatus for Manufacturing Thermoplastic Resin Material>>

Next described is the operation of the apparatus 20 (see FIG. 2) for manufacturing the thermoplastic resin material 10 (see FIG. 1).

Figure 5:
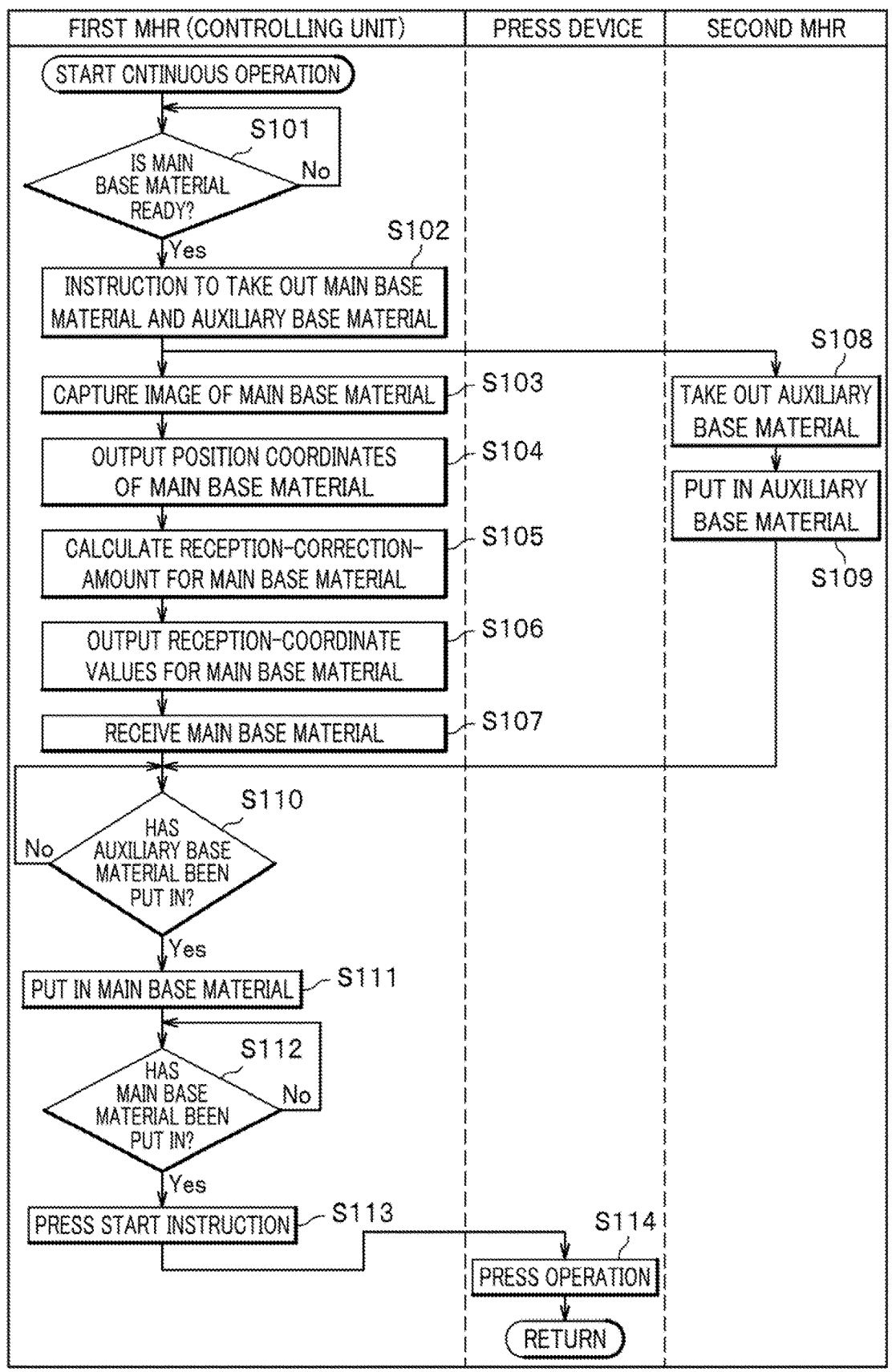
FIG. 5 is a flow chart for explaining operations of press molding of the thermoplastic resin material performed by the apparatus of FIG. 2.

FIG. 5 is a flow chart for explaining the operation of the manufacturing apparatus 20 in this embodiment performed until the thermoplastic resin material 10 is press-molded.

As shown in FIG. 5, in the manufacturing apparatus 20 (see FIG. 2) in this embodiment, the controlling unit 60 (see FIG. 2) of the first material handling robot 40A (referred to as FIRST MHR in FIG. 5), on condition that it has been confirmed by the optical sensor 52*b* (see FIG. 2) that the main base material 11 (see FIG. 2) is on the pedestal 52 (see FIG. 2) (see step S101), outputs an instruction to take out the main base material 11 and the auxiliary base material 12 (see step S102).

With this instruction, as shown in FIG. 2, the first material handling robot 40A (referred to as FIRST MHR in FIG. 5)

moves the hand part 43 to above the pedestal 52. Meanwhile, this movement is performed by the actuator (not shown) of the first material handling robot 40A based on the position coordinates of the pedestal 52 set in advance.

Then, as shown in FIG. 2, the imaging camera 56 of the first material handling robot 40A positioned above the pedestal 52 captures an image of the main base material 11 (see step S103 in FIG. 5).

In addition, with this instruction, the second material handling robot 40B (referred to as SECOND MHR in FIG. 5) move the hand part 43 to above the heating chamber 55 as shown in FIG. 2. Meanwhile, this movement is performed by the actuator (not shown) of the second material handling robot 40B based on the position coordinates of the heating chamber 55 set in advance.

Then, the second material handling robot 40B (see FIG. 2) takes the auxiliary base material 12 (see FIG. 2) out of the heating chamber 55 (see FIG. 2) (step S108 in FIG. 5).

After that, the second material handling robot 40B puts the taken-out auxiliary base material 12 into the mold 31 (see FIG. 2) (see step S109 in FIG. 5).

Figure 6A:
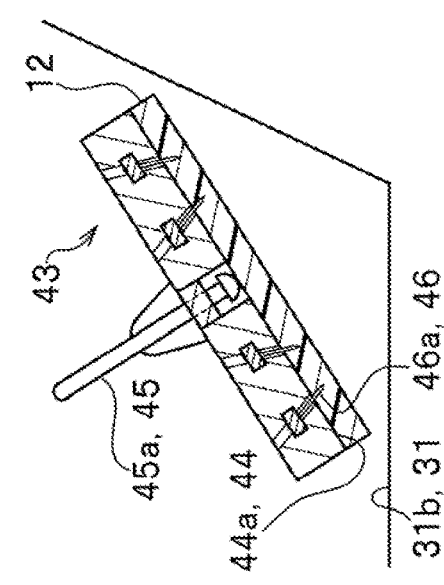
FIGS. 6A to 6C are each an explanatory diagram showing operations of the hand part in the step of preforming the auxiliary base material.
Figure 6B:
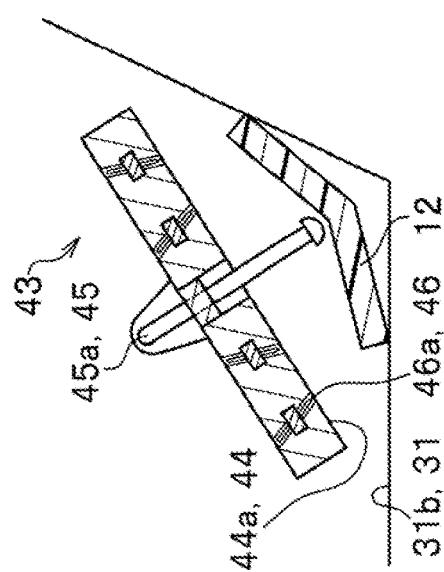
Figure 6C:
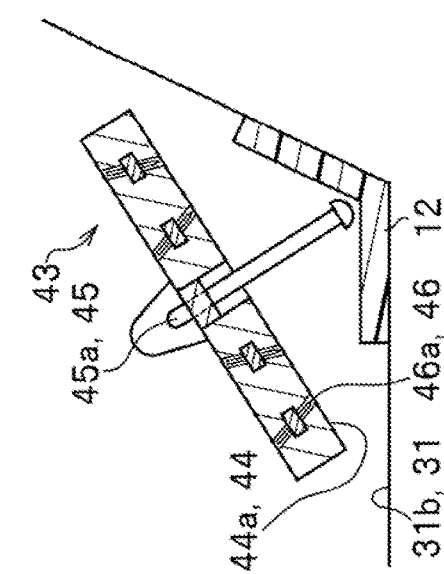

FIGS. 6A to 6C referred to below are diagrams for explaining the operation of the hand part 43 (see FIG. 3) in a preforming step in which the auxiliary base material 12 (see FIG. 1) put into the mold 31 (see FIG. 2) is preformed.

As shown in FIG. 6A, the hand part 43 in the preforming step moves the auxiliary base material 12 to a prescribed position on the mold 31 (lower mold 31b). At this time, as described above, the needle member 46a of the holding unit 46 sticks and holds the auxiliary base material 12 on the other end face 44a of the main body 44. The rod member 45a of the pusher 45 stays in the above-mentioned default position and does not protrude from the other end face 44a.

Next, in the preforming step, as shown in FIG. 6B, when the needle member 46a of the holding unit 46 moves backward into the main body 44, the auxiliary base material 12 is released from the holding unit 46. Then, the rod member 45a of the pusher 45 protrudes from the other end face 44a, to thereby press the auxiliary base material 12 toward the mold 31 (the lower mold 31b). This allows the auxiliary base material 12 to be released from the other end face 44a of the main body 44 and to be moved onto the lower mold 31b of the mold 31.

As shown in FIG. 6C, the rod member 45a of the pusher 45 works such that the auxiliary base material 12 is pressed against the lower mold 31b. At this time, the rod member 45a of the hand part 43 moves back and forth and presses the auxiliary base material 12 against the lower mold 31b a plurality of times, while the hand part 43 keeps on moving along an inner wall of the cavity by means of the actuator (not shown) and the arm part 42. A tip of the rod member 45a presses the auxiliary base material 12 such that the auxiliary base material 12 goes into even a corner or a concave portion formed on the cavity inner wall and closely adheres thereto. This allows the auxiliary base material 12 to be deformed and tailored to a cavity forming face of the lower mold 31b, after which the preforming step is terminated.

Returning to FIG. 5, the gravity-center detection unit 61a (see FIG. 4) of the controlling unit 60 (see FIG. 4), at step S104, outputs the position coordinates (the coordinates of the center of gravity) of the main base material 11 based on the captured image of the main base material 11 as described earlier (see step S104).

Then, the reception-correction-amount calculation unit 62a (see FIG. 4) of the controlling unit 60 (see FIG. 4) calculates the reception correction amount for receiving the main base material 11 as described above (see step S105). The reception-correction-amount calculation unit 62a outputs the calculated reception correction amount to the reception-coordinate-value output unit 63a (see FIG. 4) of the controlling unit 60 (see FIG. 4).

Next, the reception-coordinate-value output unit 63a (see FIG. 4) of the controlling unit 60 (see FIG. 4) outputs the reception coordinate values of the main base material 11 based on the reception correction amount outputted from the reception-correction-amount calculation unit 62a (see FIG. 4) as described above (see step S106).

Then, receiving input of this reception coordinate values, the actuator 57 (see FIG. 4) of the first material handling robot 40A (referred to as FIRST MHR in FIG. 5) moves the hand part 43 to the coordinates of the center of gravity of the main base material 11 to hold the main base material 11 with these coordinates of the center of gravity positioned at the center, as described above. With this operation, the first material handling robot 40A receives the main base material 11 (see step S107).

Next, the controlling unit 60 (see FIG. 4), on condition that the auxiliary base material 12 has already been put into the mold 31 (see step S110), instructs the actuator 57 (see FIG. 4) of the first material handling robot 40A (referred to as FIRST MHR in FIG. 5) to put the main base material 11 into the mold 31 in which the auxiliary base material 12 has been placed (see step S111).

Then, the controlling unit 60 (see FIG. 4), on condition that the main base material 11 has already been put into the mold 31 (see step S112), outputs a press start instruction to the press device 30 (see step S113).

With this start instruction, the press device 30 performs press operation (see step S114). With this operation, the thermoplastic resin material 10 is formed in the mold 31, and a subroutine of the operation of the manufacturing apparatus 20 ends.

Figure 7:
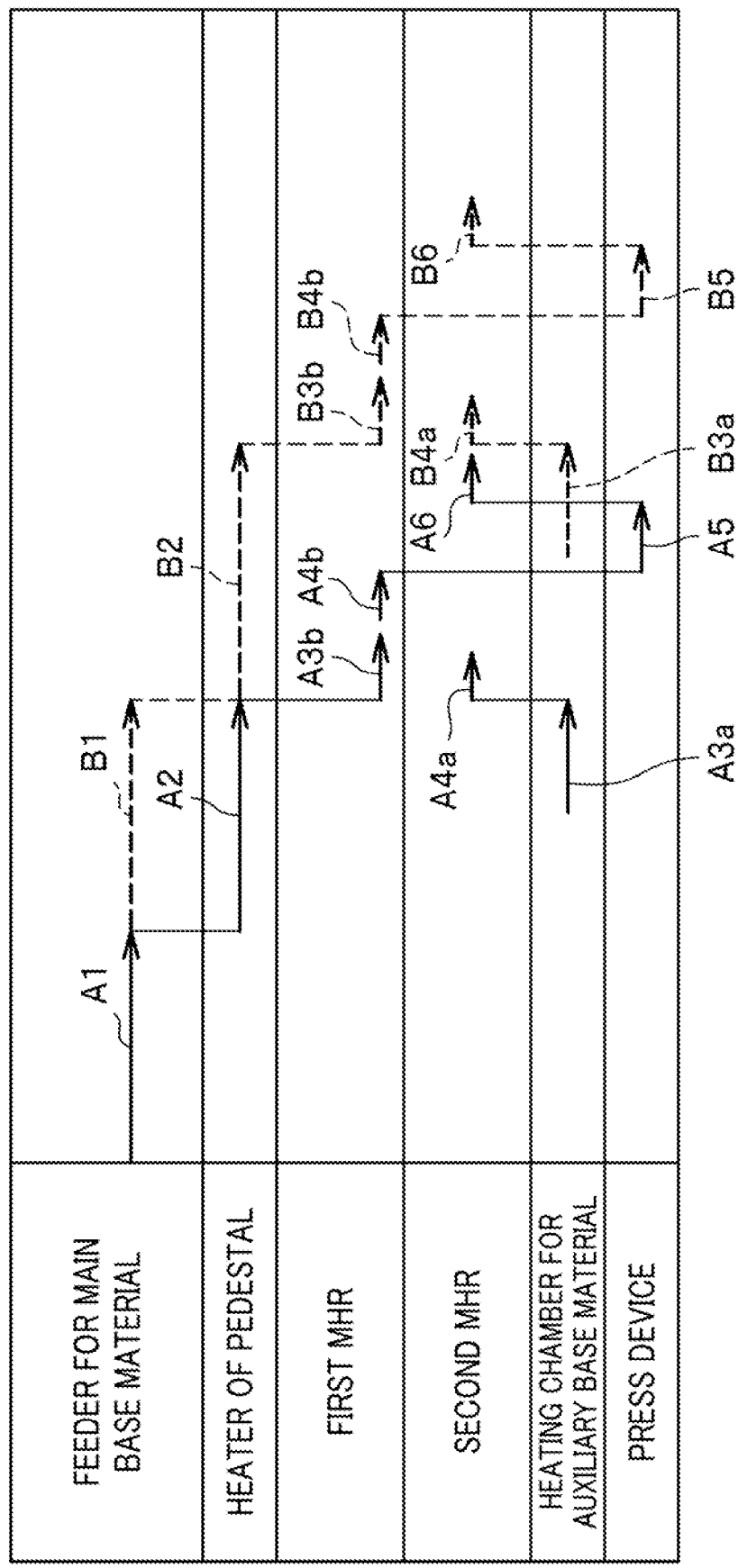
FIG. 7 is a time chart of the apparatus of FIG. 2.

FIG. 7 referred to next is a time chart of the manufacturing apparatus 20 (see FIG. 2).

The words "FEEDER FOR MAIN BASE MATERIAL" in FIG. 7 correspond to "the feeder 50 for the main base material 11" in FIG. 2. The words "HEATER OF PEDESTAL" in FIG. 7 corresponds to "the heater 52c of the pedestal 52" in FIG. 2. The words "FIRST MHR" in FIG. 7 correspond to "the first material handling robot 40A" in FIG. 2. The words "SECOND MHR" in FIG. 7 correspond to "the second material handling robot 40B" in FIG. 2. The words "HEATING CHAMBER FOR AUXILIARY BASE MATERIAL" in FIG. 7 correspond to "the heating chamber 55 for the auxiliary base material 12" in FIG. 2. The words "PRESS DEVICE" in FIG. 7 correspond to "the press device 30" in FIG. 2. Note that in this time chart, time passes from the left to the right of FIG. 7. This FIG. 7 will be described below with reference to FIG. 2.

As shown in FIG. 2, the feeder 50 for the main base material 11 kneads a thermoplastic resin R and a filling material F at a predetermined temperature and feeds the main base material 11 onto the pedestal 52 via the heat insulating chamber 51. This main-base-material feeding step is indicated by the solid arrow A1 in FIG. 7.

Next, the heater 52c of the pedestal 52 heats the main base material 11 such that the temperature of the main base material 11 is kept at a predetermined temperature described earlier. This main-base-material temperature-keeping step is indicated by the solid arrow A2 in FIG. 7. In this main-base-material temperature-keeping step A2, the controlling unit 60 (the temperature detection unit 61b, the temperature-correction-amount calculation unit 62b, and the temperature-correction-value output unit 63b) shown in FIG. 4 controls the heating temperature of the heater 52c of the pedestal 52 shown in FIG. 2, based on the captured image of the main base material 11 captured by the imaging camera 56 (the infrared detection unit 56b).

At the same time, the heating chamber 55 shown in FIG. 2 heats the auxiliary base material 12 to a predetermined temperature described earlier. This auxiliary-base-material heating step is indicated by the solid arrow A3a in FIG. 7.

Then, the second material handling robot 40B shown in FIG. 2 conveys the auxiliary base material 12 from the heating chamber 55 to the mold 31 and charge the mold 31 with it. This auxiliary-base-material mold-charging step is indicated by the solid arrow A4a in FIG. 7. Note that the temperature of the auxiliary base material 12 during conveyance is kept at a predetermined temperature by the heater 47 of the hand part 43 shown in FIG. 3.

Next, the first material handling robot 40A shown in FIG. 2 conveys the main base material 11 from the pedestal 52 to the mold 31 which has been charged with the auxiliary base material 12. This main-base-material conveyance step is indicated by the solid arrow A3b in FIG. 7.

Note that the temperature of the main base material 11 in this main-base-material conveyance step A3b is kept at a predetermined temperature by the heater 47 of the hand part 43 shown in FIG. 3.

Then, the first material handling robot 40A shown in FIG. 2 charges the mold 31 with this main base material 11. This main-base-material mold-charging step is indicated by the solid arrow A4b in FIG. 7.

In this embodiment, it is preferable to increase the amount of air blown from the heater 47, which is a fan heater, in this main-base-material mold-charging step. This optimizes the temperature of the main base material 11 in the mold 31 more reliably.

Next, the press device 30 presses the auxiliary base material 12 and the main base material 11 put in the mold 31 for a specified time under a specified temperature and pressure. With this pressing step A5 (see FIG. 7), the thermoplastic resin material 10 (see FIG. 1) is completed.

Then, in this embodiment, after the mold is opened, the second material handling robot 40B (SECOND MHR) performs a takeout step A6 for taking out the thermoplastic resin material 10 as shown in FIG. 7, and the first cycle of the manufacturing step is finished.

In the manufacturing apparatus 20 in this embodiment, the next cycle including the main-base-material feeding step B1, main-base-material temperature-keeping step B2, auxiliary-base-material heating step B3a, auxiliary-base-material mold-charging step B4a, main-base-material conveyance step B3b, main-base-material mold-charging step B4b, pressing step B5, and takeout step B6 is performed repeatedly following the first cycle, as shown in FIG.

<<Functions and Effects>>

Next, functions and effects that the manufacturing apparatus 20 in this embodiment provide will be described.

In the manufacturing apparatus 20 in this embodiment, the first material handling robot 40A (conveyance apparatus) that feeds the main base material 11 to the mold 31 includes the imaging camera 56 (detection mechanism) that detects the state of the main base material 11 and the controlling unit 60 that controls the operation of the mold 31 and the various mechanisms described above.

In the manufacturing apparatus 20 described above, the first material handling robot 40A (conveyance apparatus) monitors parameters in the manufacturing steps as a whole and controls these manufacturing steps as a control tower.

This configuration of the manufacturing apparatus 20 makes the time taken to put the main base material 11 into the mold 31 shorter than, for example, in the case of one having a control mechanism outside the manufacturing apparatus.

Next, operation of a manufacturing apparatus as a reference example will be described for comparison.

Figure 8:
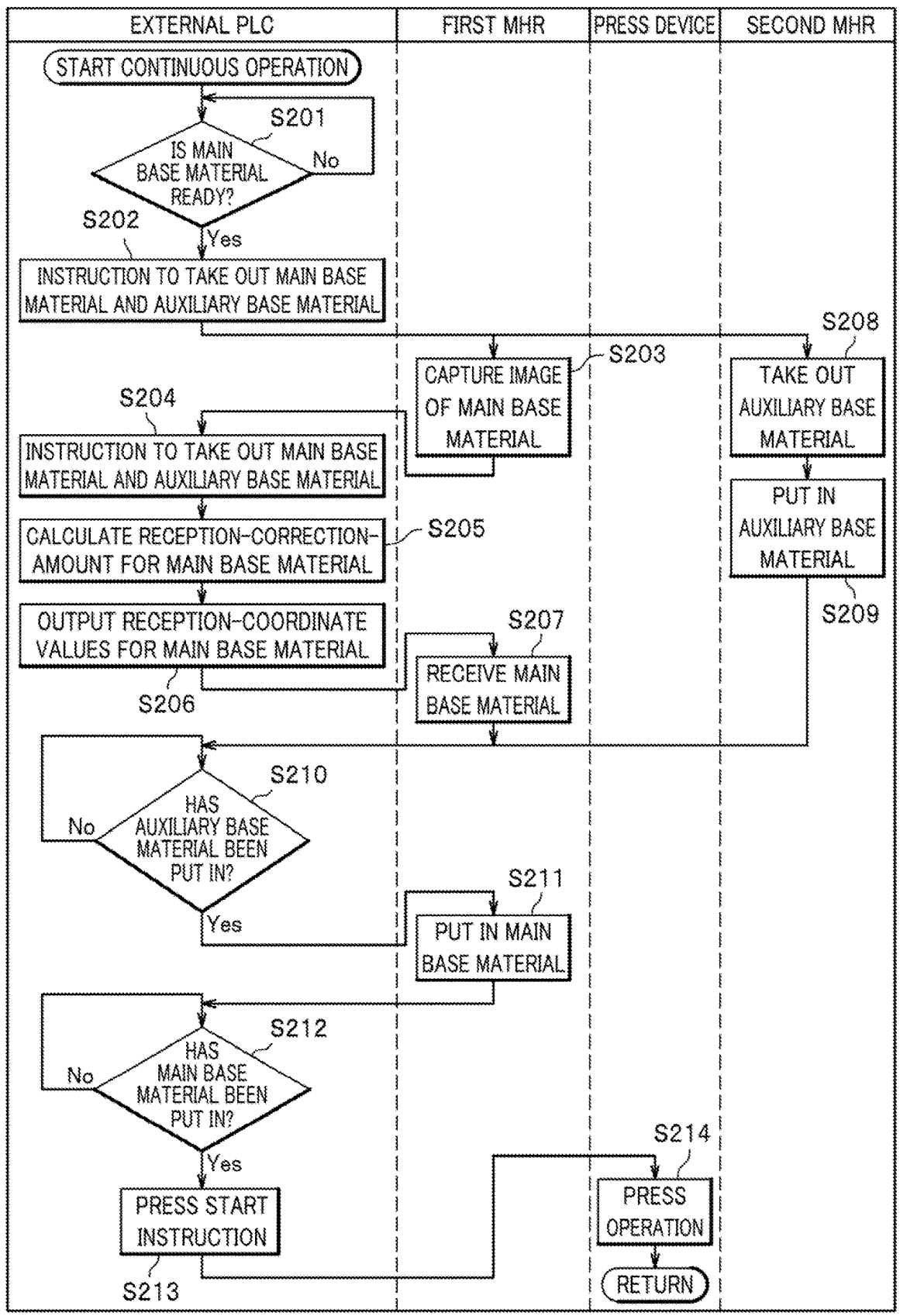
FIG. 8 is a flow chart for explaining operations of press molding of the thermoplastic resin material performed by the apparatus as a reference example.

FIG. 8 is a flow chart for explaining the operation of the manufacturing apparatus as a reference example performed until the manufacturing apparatus press-molds the thermoplastic resin material 10.

Although not-illustrated, this manufacturing apparatus of the reference example is assumed to be one having a controlling unit 60 (see FIG. 4) outside the manufacturing apparatus, unlike the manufacturing apparatus 20 in this embodiment. This manufacturing apparatus of the reference example has almost the same configuration as the manufacturing apparatus 20 in this embodiment except the location of the controlling unit 60.

As shown in FIG. 8, in the manufacturing apparatus of the reference example, when continuous operation starts, the controlling unit (hereinafter referred to as the external programmable logic controller (PLC)), on condition that it has been confirmed by the optical sensor 52b (see FIG. 2) that the main base material 11 is on the pedestal 52 (see step S201), outputs an instruction to take out the main base material 11 (see FIG. 2) and the auxiliary base material 12 (see step S202).

Then, the imaging camera 56 (see FIG. 2) of the first material handling robot 40A (referred to as FIRST MHR in FIG. 8) captures an image of the main base material 11 (see FIG. 2) (see step S203).

In addition, the second material handling robot 40B (referred to as SECOND MHR in FIG. 8) takes the auxiliary base material 12 (see FIG. 2) out of the heating chamber 55 (see FIG. 2) (see step S208 in FIG. 8).

The second material handling robot 40B puts the taken-out auxiliary base material 12 into the mold 31 (see FIG. 2) (see step S209).

Meanwhile, the captured image data on the main base material 11 (see FIG. 2) captured at step S203 is outputted to the external PLC. With this operation, the external PLC calculates the position coordinates of the main base material 11 described earlier and outputs the calculation result (see step S204).

Then, the external PLC calculates the reception correction amount of the main base material 11 described earlier (see step S205).

Next, the external PLC calculates the reception coordinate values of the main base material 11 described earlier based on this reception correction amount and outputs the resultant values to the actuator 57 (see FIG. 4) of the first material handling robot 40A (referred to as FIRST MHR in FIG. 8) (see step S206).

Then, receiving input of these reception coordinate values, the actuator 57 (see FIG. 4) of the first material handling robot 40A (referred to as FIRST MHR in FIG. 8) works to receive the main base material 11 by holding it (see step S207).

Next, the external PLC, on condition that the auxiliary base material 12 (see FIG. 2) has already been put into the mold 31 (see FIG. 2) (see step S210), instructs the actuator 57 (see FIG. 4) of the first material handling robot 40A (referred to as FIRST MHR in FIG. 8) to put the main base material 11 into the mold 31 in which the auxiliary base material 12 has been placed (see step S211).

Then, the external PLC, on condition that the main base material 11 has already been put into the mold 31 (see step S212), outputs a press start instruction to the press device 30 (see step S213).

With this start instruction, the press device 30 performs press operation (see step S214). With this operation, the thermoplastic resin material 10 is formed in the mold 31, and a subroutine of the operation of the manufacturing apparatus of the reference example ends.

As described above, in the manufacturing apparatus of the reference example controlled by the external PLC, the exchange of signals between the external PLC and the first material handling robot 40A and press device 30 (mold 31) is complicated. In contrast, in the manufacturing apparatus 20 in this embodiment, the exchange of these signals is simple as shown in FIG. 5.

Specifically, in the manufacturing apparatus of the reference example having the external PLC shown in FIG. 8, signals are exchanged three times between the external PLC and the first material handling robot 40A (FIRST MHR in FIG. 8). Specifically, as shown in FIG. 8, the exchanges of signals occur during the steps from step S202 via step S203 to step S204, during the steps from step S206 via step S207 to step S210, and during the steps from step S210 via step S211 to step S212.

As compared to this operation, in the manufacturing apparatus 20 in this embodiment shown in FIG. 5, all the exchanges of signals during the steps from step S102 via step S103 to step S104, during the steps from step S106 via step S107 to step S110, and during the steps from step S110 via step S111 to step S112, which correspond to the exchanges of signals performed in the reference example, are performed within the first material handling robot 40A (FIRST MHR in FIG. 5).

This configuration of the manufacturing apparatus 20 in this embodiment reduces the time taken for the exchange of signals, thereby reducing the time taken to put the main base material 11 into the mold 31. As a result, the time taken to put the main base material 11 into the mold 31 is reduced. This configuration of the manufacturing apparatus 20 in this embodiment makes it possible to put the main base material 11 into the mold 31 without the temperature of the main base material 11 going down. Thus, in the manufacturing apparatus 20, when the main base material 11 is molded in the mold 31, the fluidity of the main base material 11 is kept favorable, making it possible to provide the thermoplastic resin material 10 (resin molded part) with high quality.

In addition, in the manufacturing apparatus 20 in this embodiment, the foregoing reduction of the number of exchanges of signals makes it possible to avoid the occurrence of negative incidents such as signal errors, bugs, or instability of the system.

In this embodiment, the first material handling robot 40A (transfer mechanism) has the hand part 43 (the gripping part) that holds the main base material 11, and the hand part 43 includes the heater 47 (the first temperature adjusting unit) that adjusts the temperature of the main base material 11.

In the manufacturing apparatus 20 as described above, the temperature of the main base material 11 does not go down during conveyance, in virtue of the heater 47 of the hand part 43.

Thus, the fluidity of the main base material 11 is kept favorable in molding in the mold 31 in the manufacturing apparatus 20, making it possible to provide the thermoplastic resin material 10 (resin molded part) with high quality.

In addition, in the manufacturing apparatus 20 as described above, the heater 47 of the hand part 43 makes it possible to have a buffer time between adjacent two steps, and this enables highly efficient production of the thermoplastic resin material 10 (resin molded part).

In addition, in this embodiment, the pedestal 52 has the heater 52c which corresponds to the second temperature adjusting unit for the main base material 11 (base material).

In the manufacturing apparatus 20 as above, the heater 52c keeps the temperature of the main base material 11 while the imaging camera 56 is detecting the state of the main base material 11 on the pedestal 52. The heater 52c is capable of changing the temperature of the main base material 11 according to the detection result of the state of the main base material 11.

Thus, the manufacturing apparatus 20 can put the main base material 11 into the mold 31 in the optimum condition.

As a result, the fluidity of the main base material 11 is kept favorable in molding in the mold 31 in the manufacturing apparatus 20, making it possible to provide the thermoplastic resin material 10 (resin molded part) with high quality.

In addition, in this embodiment, the imaging camera 56, corresponding to the detection mechanism, includes the infrared detection unit 56b (temperature detection mechanism) that detects the surface temperature of the main base material 11.

Since the surface temperature of the main base material 11 is checked in the manufacturing apparatus 20 as above, it is possible to keep the fluidity of the main base material 11 favorable in the mold 31.

Thus, the fluidity of the main base material 11 is kept favorable in molding in the mold 31 in the manufacturing apparatus 20, making it possible to provide the thermoplastic resin material 10 (resin molded part) with high quality.

In addition, in this embodiment, the imaging camera 56, corresponding to the detection mechanism, includes the normal-light detection unit 56a (the gravity-center detection mechanism) that detects the position of the center of gravity of the main base material 11.

Multiple main base materials 11 fed sequentially from the feeder 50 may have variation in the position of the center of gravity in the manufacturing apparatus 20 as above.

Since the manufacturing apparatus 20 in this embodiment checks the position of the center of gravity of each main base material 11, it is possible to adjust the position in the mold 31 at which the main base material 11 is put in so that its fluidity within the mold 31 is favorable.

In addition, using the normal-light detection unit 56a (the gravity-center detection mechanism), the manufacturing apparatus 20 can detect the center of gravity of the main base material 11 in real time with a simple configuration, unlike ones in which program adjustment takes a long time, such as, for example, machine learning. Thus, the manufacturing apparatus 20 is excellent in the productivity for the thermoplastic resin material 10 (resin molded part).

In addition, since the controlling unit 60 of the first material handling robot 40A (transfer mechanism) controls the entire manufacturing apparatus 20 in this embodiment, even in the case where each piece of the equipment such as the feeders 50 and 59 for the main base material 11 and the auxiliary base material 12 and the press device 30 is separately introduced and arranged, it is possible to synchronize those pieces of equipment.

This increases the flexibility of layout in arranging equipment on site.

In addition, since the controlling unit 60 of the first material handling robot 40A (transfer mechanism) controls the entire manufacturing apparatus 20 in this manufacturing apparatus 20, the sequence program is simple, and the response time of electrical signals is minimized. Thus, the molding cycle of the thermoplastic resin material 10 (resin molded part) is short in the manufacturing apparatus 20.

Since the time required to produce the main base material 11 is short in this manufacturing apparatus 20, the overall molding cycle is short, and the productivity is high. In short, this manufacturing apparatus 20 makes it possible to increase production output.

In addition, since in this manufacturing apparatus 20, the main base material 11 sequentially fed from the heat insulating chamber 51 is conveyed to the mold 31 efficiently by the first material handling robot 40A (transfer mechanism), it is possible to prevent resin deterioration that would occur due to overheating in the heat insulating chamber 51. Thus, the manufacturing apparatus 20 provides the thermoplastic resin material 10 (resin molded part) with high quality. Thus, the manufacturing apparatus 20 makes it possible to reduce the weight, the material cost, and the like of the thermoplastic resin material 10 (resin molded part) by reducing the thickness or the like.

Other Embodiments

Although the embodiment of the present invention has been described as above, the present invention is not limited to the foregoing embodiment but can be modified in various ways within the range not departing from the spirit of the present invention.

Figure 9:
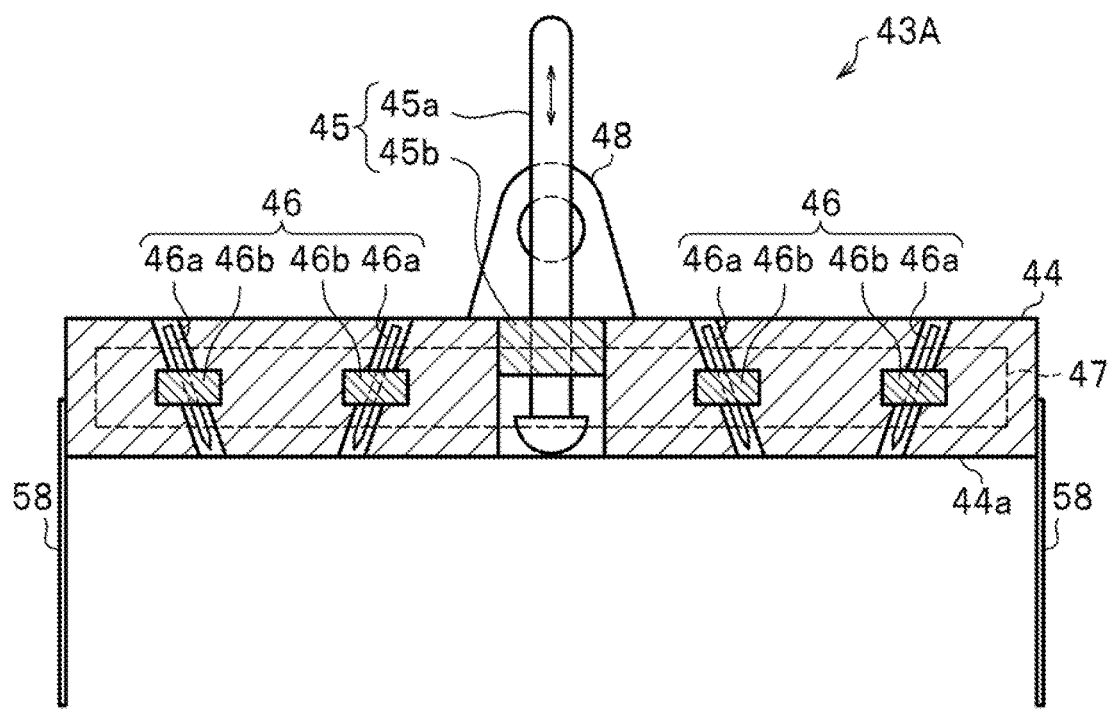
FIG. 9 is an explanatory diagram showing a structure of a hand part according to a modified example.
Figure 10:
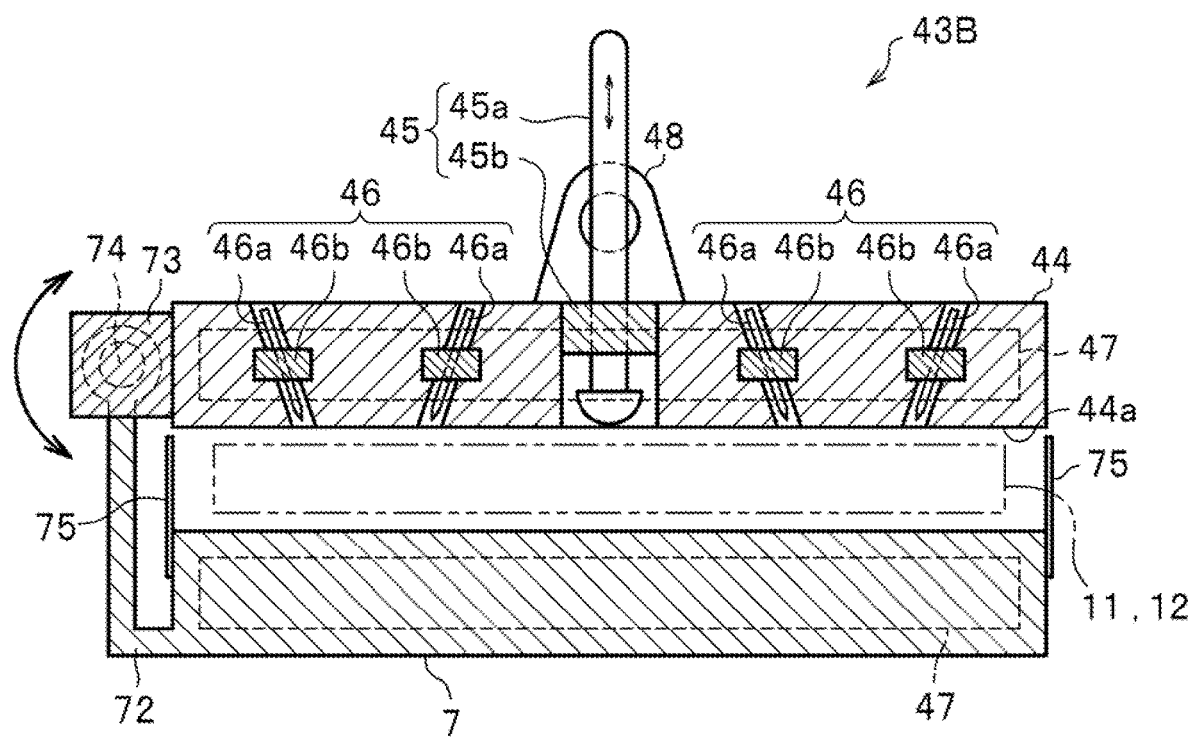
FIG. 10 is an explanatory diagram showing a structure of a hand part according to a modified example.

FIGS. 9 and 10 referred to next are diagrams for explaining the structures of hand parts 43A and 43B according to modified examples. Note that the same constituents as in the hand part 43 (see FIG. 3) in the foregoing embodiment are denoted by the same reference numerals, and description thereof is omitted.

As shown in FIG. 9, the hand part 43A according to a modified example includes shrouds 58 that extend in a rectangular tube form from the side surfaces of the main body 44 so as to surround the other end face 44a side. It is preferable that these shrouds 58 be formed of elastic resin sheets such as, for example, silicone.

These shrouds 58 as above reduce the heat dissipation of the main base material 11 or the auxiliary base material 12 that occurs while the main base material 11 or the auxiliary base material 12 (see FIG. 2) held on the other end face 44a side by the holding units 46 is being conveyed by the hand part 43A.

As shown in FIG. 10, the hand part 43B according to a modified example has a heating member 7 that faces the other end face 44a of the main body 44.

This heating member 7 has a thin rectangular parallelepiped shape the planar shape of which is approximately the same as that of the main body 44. The heating member 7 has a built-in heater 47.

On one side face of the heating member 7 is provided an arm 72 having an L shape and extending toward a side face of the main body 44 L. The distal end of this arm 72 is connected to a rotation shaft 74 of an actuator 73 provided at the side face of the main body 44.

With the hand part 43B as above, the main base material 11 or the auxiliary base material 12 is placed between the main body 44 and the heating member 7, and the temperature of the main base material 11 or the auxiliary base material 12 is kept at a predetermined temperature more reliably during conveyance.

When the main body 44 receives the main base material 11 or the auxiliary base material 12 and when the main body 44 releases the main base material 11 or the auxiliary base material 12 (when charging the mold 31 with it), the heating member 7 rotates on the rotation shaft 74 and opens.

Note that the reference numerals 75 in FIG. 10 indicate shrouds that extend in a rectangular tube form from the side surfaces of the heating member 7 so as to surround the other end face 44a side. These shrouds 75 may be provided on the main body 44 or may be provided on both of the heating member 7 and the main body 44.

Although in the foregoing embodiment, the imaging camera 56 and the controlling unit 60 are provided only to the first material handling robot 40A, they may be provided also to the second material handling robot 40B.

In addition, although in the foregoing embodiment, it is assumed that the movement of the auxiliary base material 12 from the storage unit 54 to the heating chamber 55 is performed by a not-illustrated lift, the second material handling robot 40B may perform this operation.

DESCRIPTION OF REFERENCE NUMERALS

10 thermoplastic resin material
11 main base material (base material)
12 auxiliary base material
20 manufacturing apparatus
30 press device
31 mold
31a upper mold
31b lower mold
32 base
40 material handling robot
40A material handling robot (transfer mechanism)
40B material handling robot
41 support part
42 arm part
43 hand part (gripping part)
43A hand part
43B hand part
45 pusher
45a rod member
45b actuator
46 holding unit
46a needle member
46b actuator
47 heater (first temperature adjusting unit)
48 attaching unit
50 feeder for main base material
51 heat insulating chamber
52 pedestal
52b optical sensor
52c heater (second temperature adjusting unit)
53 kneading extruder
54 storage unit
54a stocking jig
55 heating chamber
56 imaging camera (detection mechanism)
56a normal-light detection unit (gravity-center detection mechanism)
56b infrared detection unit (temperature detection mechanism)
57 actuator
59 feeder for auxiliary base material
60 controlling unit
61 image processing unit
61a gravity-center detection unit
61b temperature detection unit
62 operation-amount calculation unit
62a reception-correction-amount calculation unit 62b temperature-correction-amount calculation unit
63 operation-amount output unit
63a reception-coordinate-value output unit
63b temperature-correction-value output unit

The invention claimed is:

1. An apparatus for manufacturing a thermoplastic resin material, comprising:
   a mold for molding a base material containing a thermoplastic resin into a predetermined shape;
   a transfer mechanism that places the base material in the mold, and
   a pedestal on which the base material is placed, wherein
   the transfer mechanism includes
   a detection mechanism that detects a state of the base material, and
   a controlling unit that controls operation of the mold and the transfer mechanism, and
   the detection mechanism is an imaging camera, and includes a gravity-center detection mechanism, and
   the gravity-center detection mechanism detects a position of a center of gravity of the base material defined within its planar shape based on an image of the planar shape of the base material.

2. The apparatus for manufacturing a thermoplastic resin material according to claim 1, wherein
   the transfer mechanism has a gripping part that holds the base material, and
   the gripping part includes a first temperature adjusting unit that adjusts the temperature of the base material.

3. The apparatus for manufacturing a thermoplastic resin material according to claim 1, wherein
   the pedestal has a second temperature adjusting unit that adjusts the temperature of the base material.

4. The apparatus for manufacturing a thermoplastic resin material according to claim 3, wherein
   the detection mechanism includes a temperature detection mechanism that measures the surface temperature of the base material placed on the pedestal.

5. The apparatus for manufacturing a thermoplastic resin material according to claim 4, wherein
   the gravity-center detection mechanism is a normal-light detection unit of the imaging camera, and
   the temperature detection mechanism is an infrared detection unit of the imaging camera.

* * * * *